United States Patent
Harrell et al.

(10) Patent No.: US 9,537,939 B1
(45) Date of Patent: Jan. 3, 2017

(54) METHODS AND SYSTEMS FOR HANDLING A SINGLE TRANSACTION WITH MULTIPLE DEVICES

(71) Applicant: Mast Industries (Far East) Limited, Kowloon Bay, Kowloon (HK)

(72) Inventors: Jason Harrell, Delaware, OH (US); Trent Hoverman, Dublin, OH (US); Murali Sundararajan, New Albany, OH (US)

(73) Assignee: MAST INDUSTRIES (FAR EAST) LIMITED, Kowloon Bay, Kowloon (HK)

( * ) Notice: Subject to any disclaimer, the term of this patent is extended or adjusted under 35 U.S.C. 154(b) by 0 days.

(21) Appl. No.: 14/817,826

(22) Filed: Aug. 4, 2015

(51) Int. Cl.
*H04L 29/08* (2006.01)
*G06Q 20/20* (2012.01)
*G06F 9/46* (2006.01)

(52) U.S. Cl.
CPC .............. *H04L 67/10* (2013.01); *G06F 9/466* (2013.01); *G06Q 20/20* (2013.01)

(58) Field of Classification Search
None
See application file for complete search history.

(56) References Cited

U.S. PATENT DOCUMENTS

| | | | | |
|---|---|---|---|---|
| 7,512,567 B2* | 3/2009 | Bemmel | ................ | G06Q 20/20 705/64 |
| 8,943,598 B1* | 1/2015 | Kurian | ................. | G06F 21/602 726/22 |
| 2003/0195963 A1* | 10/2003 | Song | ..................... | H04L 67/142 709/227 |
| 2008/0046366 A1* | 2/2008 | Bemmel | ................ | G06Q 20/20 705/44 |
| 2009/0138366 A1* | 5/2009 | Bemmel | ................ | G06Q 20/20 705/17 |
| 2009/0204504 A1* | 8/2009 | De Araujo | ............. | G06Q 20/20 705/21 |
| 2012/0197744 A1* | 8/2012 | Rose | .................... | G06Q 20/202 705/17 |
| 2012/0330769 A1* | 12/2012 | Arceo | ................ | G06Q 20/4014 705/21 |
| 2013/0019114 A1* | 1/2013 | Sumida | ..................... | G06F 1/26 713/300 |
| 2013/0076645 A1* | 3/2013 | Anantha | ................ | G06F 3/0488 345/173 |
| 2013/0085879 A1* | 4/2013 | Edwards | ............ | G06Q 30/0281 705/23 |
| 2013/0138517 A1* | 5/2013 | Khan | ..................... | G06Q 30/00 705/16 |
| 2014/0173125 A1* | 6/2014 | Selvanandan | ......... | H04L 67/141 709/229 |
| 2015/0026351 A1* | 1/2015 | Calman | ............... | H04L 65/1083 709/227 |
| 2015/0163254 A1* | 6/2015 | Romero | ................. | H04L 47/10 709/227 |

* cited by examiner

*Primary Examiner* — Ninos Donabed
(74) *Attorney, Agent, or Firm* — Ballard Spahr LLP

(57) ABSTRACT

In an aspect, a method for handling a transaction with multiple devices is described. The method can include storing information pertaining to a transaction on a first device and receiving on the first device an indication that the transaction will be passed to a second device. In response to receiving an indication that the transaction will be passed to the second device, information pertaining to the transaction can be transmitted to the second device.

13 Claims, 8 Drawing Sheets

METHODS AND SYSTEMS FOR HANDLING A SINGLE TRANSACTION WITH MULTIPLE DEVICES

BACKGROUND

Conventional systems for handling transactions typically employ a single device that records and stores all of the information pertaining to a transaction. That device, be it a stationary or a mobile device, that single device is solely responsible for recording all information relating to a particular transaction.

Conventional systems do not allow for the division of a transaction among multiple devices, and therefore, do not allow for tracking of circumstance in which multiple individuals using multiple devices may be responsible for various aspects of a given transaction. Conventional systems also do not allow an in-process transaction to be transitioned from one device to another so as to facilitate the handling of the transaction on disparate devices.

SUMMARY

It is to be understood that both the following general description and the following detailed description are exemplary and explanatory only and are not restrictive, as claimed. Provided are methods and systems for handling a single transaction with multiple devices.

In an aspect a system for handling a transaction with multiple devices is described. The system can include a transaction that can include a transaction identifier. The transaction can be configured to store information pertaining to at least one item. The system can also include a first device that can include a transaction application configured to receive information pertaining to the transaction. The first device can also include an item acquisition system configured to obtain information about an item and add that item to the transaction. The item acquisition system can be a scanner. The first device can also include a communication system that is configured to transmit information pertaining to the transaction to a second device. The communication system can communicate via radio frequency signals. The communication system can also communicate via audio signals. The first device can also include a pass initiation system that is configured to receive an indication that the transaction is to be passed to a second device.

The system can also include a second device. The second device can include a communication system configured to receive information pertaining to the transaction from the first device and an item acquisition system configured to obtain information about an item. On receiving an indication that the transaction is to be passed to the second device, transmitting information pertaining to the transaction to the second device. The first device and the second device can be mobile devices. In an aspect, the device can be a mobile telephone, a tablet computer, a point of sale terminal, or a laptop computer. In an aspect, the system can also include a customer mobile device that is configured to transmit information about a customer to the first device.

The information pertaining to the transaction transmitted to the second device can be the transaction identifier. The second device can obtain the information pertaining to at least one item from a server. The server can suspend the transaction on receiving an indication that the transaction is to be passed to a second device. The server can resume the transaction on receiving an indication that the transaction has been passed to the second device.

In an aspect, the transaction can be configured to store information identifying the device that was used to add the item to the transaction. In another aspect, the transaction can be configured to store information pertaining to the user that added the item to the transaction.

In another aspect, a method for handling a transaction with multiple devices is described. The method can include the steps of storing, on a first device, information pertaining to a transaction. The information can include the identification of an item in the transaction. The information pertaining to the item can include the identity of the device that added the item to the transaction or the identity of an individual who was operating the device when the item was added.

The method can also include receiving, on the first device, an indication that the transaction will be passed to the second device. In response to receiving an indication that the transaction will be passed to the second device, information pertaining to the transaction can be transmitted to the second device. The indication that the transaction will be passed to the second device can include a swipe on the screen of the first device, a rapid acceleration of the first device while in proximity of the second device, and pressing a button on the first device.

In an aspect, transmitting information pertaining to the transaction can include transmitting transaction identification information pertaining to the transaction from the first device to the second device, transmitting transaction identification information from the second device to a server that is storing the transaction, and receiving, from the server, the transaction associated with the transaction identification information.

The method can also include receiving, on the second device, information pertaining to the transaction and adding an item to the transaction using the second device. The method can also include suspending the transaction until the transaction associated with the transaction identification information has been received. The method can also include the step of transmitting the transaction to a point of sale device configured to receive tender to complete the transaction.

In another aspect, a method for handling a transaction with multiple devices is described. The method can include storing, on a first device, information pertaining to a transaction, the information including an identification of an item in the transaction. The method can also include receiving, on the first device, an indication that the transaction will be passed to a second device. In response to receiving an indication that the transaction will be passed to the second device, transmitting an indication to a server that the transaction should be suspended, and suspending the transaction.

The method can also include receiving, on the second device, identifying information pertaining to the transaction and transmitting, from the second device, identifying information pertaining to the transaction to the server. In response to transmitting identifying information pertaining to the transaction to the server, receiving the transaction on the second device.

The method can also include resuming the transaction in response to receiving the transaction on the second device. An item can be added to the transaction using the second device. The transaction can be transmitted to a point of sale device configured to receive tender to complete the transaction.

Additional advantages will be set forth in part in the description which follows or may be learned by practice.

The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
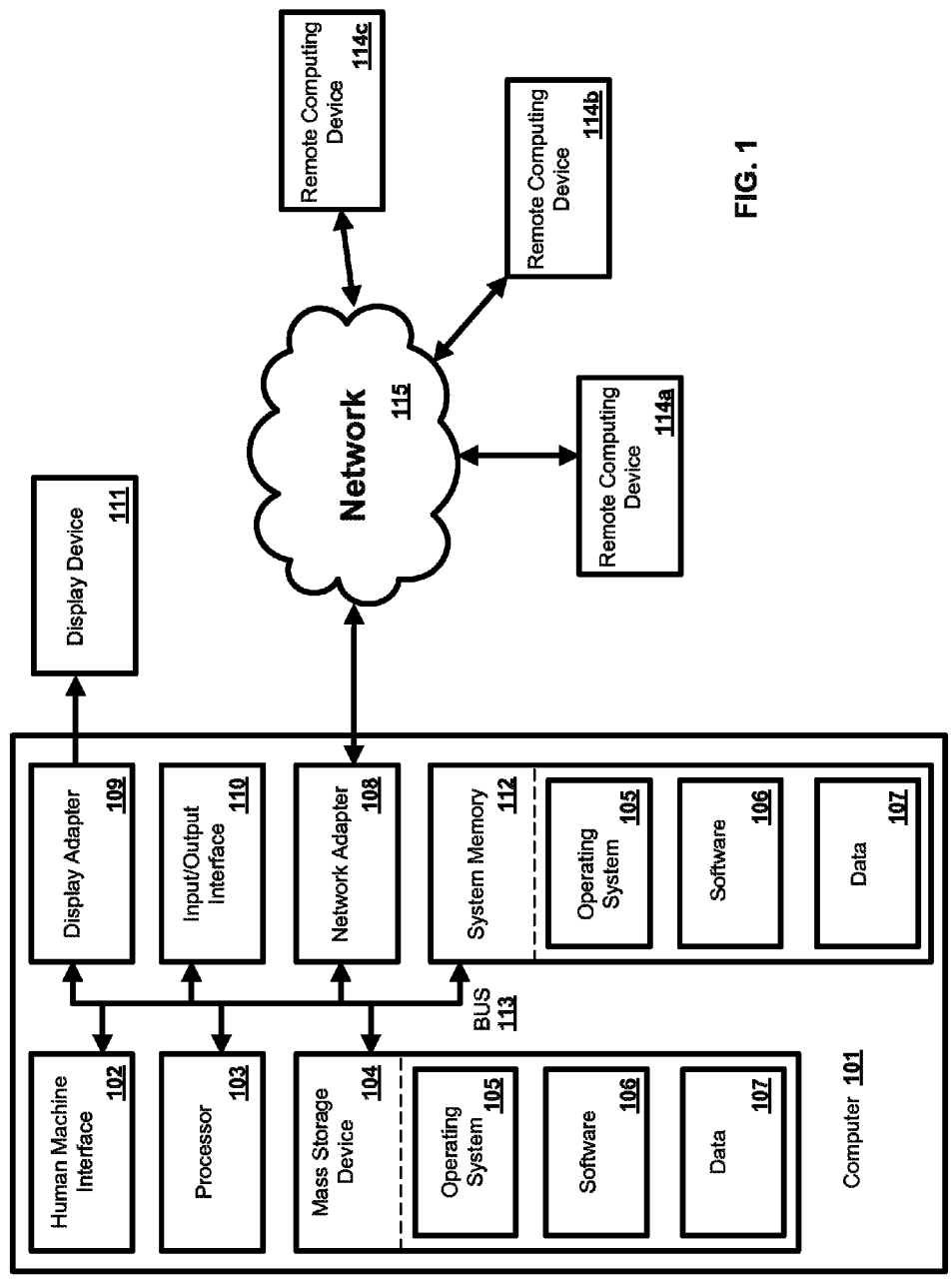
FIG. 1 is a block diagram illustrating an exemplary system in which the methods and systems described herein can operate.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

FIG. 1 illustrates various aspects of an exemplary system in which the present methods and systems can operate. The present disclosure relates to methods and systems for delivering individualized content. Those skilled in the art will appreciate that present methods may be used in systems that employ both digital and analog equipment. One skilled in the art will appreciate that provided herein is a functional description and that the respective functions can be performed by software, hardware, or a combination of software and hardware.

In an exemplary aspect, the methods and systems can be implemented on a computer 101 as illustrated in FIG. 1 and described below. The methods and systems disclosed can utilize one or more computers to perform one or more functions in one or more locations. FIG. 1 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 101. The components of the computer 101 can comprise, but are not limited to, one or more processors or processing units 103, a system memory 112, and a system bus 113 that couples various system components including the processor 103 to the system memory 112. In the case of multiple processing units 103, the system can utilize parallel computing.

The system bus 113 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 113, and all buses specified in this description can also be implemented over a wired or wireless network connection and each of the subsystems, including the processor 103, a mass storage device 104, an operating system 105, software 106, data 107, a network adapter 108, system memory 112, an Input/Output Interface 110, a display adapter 109, a display device 111, and a human machine interface 102, can be contained within one or more remote computing devices 114a,b,c at physically separate locations, connected through buses of this form, in effect implementing a fully distributed system.

The computer 101 typically comprises a variety of computer readable media. Exemplary readable media can be any available media that is accessible by the computer 101 and comprises, for example and not meant to be limiting, both volatile and non-volatile media, removable and non-removable media. The system memory 112 comprises computer readable media in the form of volatile memory, such as random access memory (RAM), and/or non-volatile memory, such as read only memory (ROM). The system memory 112 may contain data such as media, video, audio, program code, markup language, or other data 107 and/or program modules such as operating system 105 and software 106 capable of receiving requests for content, identifying the appropriate content with which to respond, and intercepting and replacing content with individualized content that can include the data 107 that are immediately accessible to and/or are presently operated on by the processing unit 103.

In another aspect, the computer 101 can also comprise other removable/non-removable, volatile/non-volatile computer storage media. By way of example, FIG. 1 illustrates a mass storage device 104 which can provide non-volatile storage of computer code, computer readable instructions, data structures, program modules, and other data for the computer 101. For example and not meant to be limiting, a mass storage device 104 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 104, including by way of example, an operating system 105 and content delivery software 106. Each of the operating system 105 and content delivery software 106 (or some combination thereof) can comprise elements of the programming and the content delivery software 106. Media, video, audio, program code, markup language, or other data 107 can also be stored on the mass storage device 104. Media, video, audio, or other data 107 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 101 via an input device (not shown). Examples of such input devices comprise, but are not limited to, a keyboard, pointing device (e.g., a "mouse"), a microphone, a joystick, a scanner, tactile input devices such as gloves, and other body coverings, and the like. These and other input devices can be connected to the processing unit 103 via a human machine interface 102 that is coupled to the system bus 113, but can be connected by other interface and bus structures, such as a parallel port, game port, an IEEE 1394 Port (also known as a Firewire port), a serial port, or a universal serial bus (USB).

In yet another aspect, a display device 111 can also be connected to the system bus 113 via an interface, such as a display adapter 109. It is contemplated that the computer 101 can have more than one display adapter 109 and the computer 101 can have more than one display device 111. For example, a display device can be a monitor, an LCD (Liquid Crystal Display), or a projector. In addition to the display device 111, other output peripheral devices can comprise components such as speakers (not shown) and a printer (not shown) which can be connected to the computer 101 via Input/Output Interface 110. Any step and/or result of the methods can be output in any form to an output device. Such output can be any form of visual representation, including, but not limited to, textual, graphical, animation, audio, tactile, and the like. The display 111 and computer 101 can be part of one device, or separate devices.

The computer 101 can operate in a networked environment using logical connections to one or more remote computing devices 114*a,b,c*. By way of example, a remote computing device can be a personal computer, portable computer, smartphone, a server, a router, a network computer, a peer device or other common network node, and so on. Logical connections between the computer 101 and a remote computing device 114*a,b,c* can be made via a network 115, such as a local area network (LAN) and/or a general wide area network (WAN). Such network connections can be through a network adapter 108. A network adapter 108 can be implemented in both wired and wireless environments. Such networking environments are conventional and commonplace in dwellings, offices, enterprise-wide computer networks, intranets, and the Internet.

For purposes of illustration, application programs and other executable program components such as the operating system 105 are illustrated herein as discrete blocks, although it is recognized that such programs and components reside at various times in different storage components of the computing device 101, and are executed by the data processor(s) of the computer. An implementation of content delivery software 106 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

Figure 2:
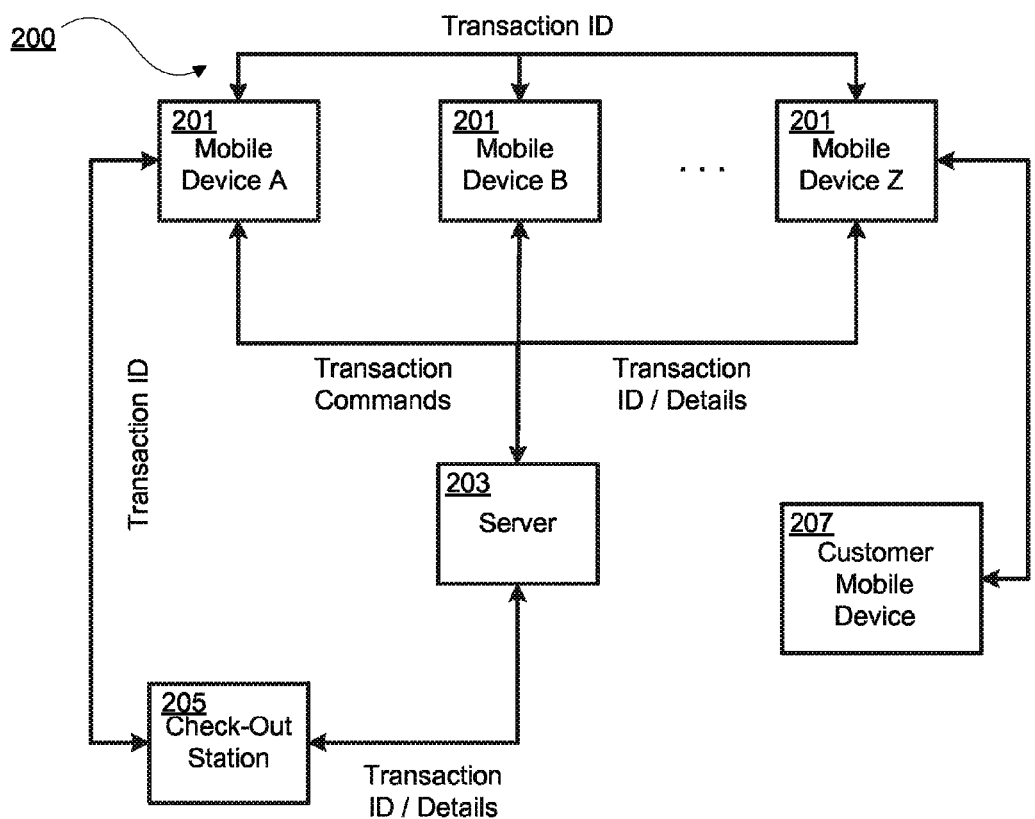
FIG. 2 is a block diagram illustrating an exemplary embodiment of a system for handling a single transaction with multiple devices in accordance with the methods and systems described herein.

Turning now to FIG. 2, a block diagram illustrating an exemplary embodiment of a system 200 for handling a single transaction with multiple devices in accordance with the methods and systems described herein is shown. The system 200 includes at least one mobile device 201. In an exemplary embodiment, the mobile device 201 can be a transportable point of sale device. In that embodiment, the mobile device 201 may be carried by an individual salesperson. The salesperson may then carry out a transaction on the mobile device 201. By way of example, the salesperson may use the mobile device 201 to add items to be sold to a transaction that is stored on the mobile device 201. The features of an exemplary mobile device 201 will be described in greater detail with respect to FIG. 3.

The mobile device 201 stores a transaction. In an exemplary embodiment, the mobile device 201 stores a single transaction, representing a transaction currently in progress. In an alternative exemplary embodiment, the mobile device 201 stores multiple transactions, but operates on one of the transactions at a time. In another alternative exemplary embodiment, the mobile device 201 stores only an identifier of a given transaction, while remaining information pertaining to the transaction is stored on a mobile device 201, such as, for example, server 203. An exemplary transaction will be discussed in greater detail with respect to FIG. 3.

The mobile device 201 can be communicatively coupled to at least one other mobile device 201. As one of skill in the art would understand, there are a variety of communications protocols available to provide a communications link between the mobile devices 201. By way of example, the mobile devices 201 can communicate using audio communication. Alternatively the mobile devices 201 can communicate by way of a radiofrequency protocol such as Bluetooth or any of the 802.11 (WiFi) standards. Alternatively, the mobile devices 201 can communicate with one another using text-based protocols, such as SMS (short message service), via an infrared communications link, or any other communications protocol, as would be understood by one of skill in the art.

The mobile device 201 is configured to pass a transaction to a second mobile device 201 using the communication protocol. In an exemplary embodiment, the mobile device 201 transmits an identifier of a given transaction to another mobile device 201. Using the identifier, the second mobile device 201 can then retrieve other information about the transaction from a mobile device 201 or other remote computing device so as to carry out the transaction. In an alternative exemplary embodiment, the mobile device 201 can transmit additional information pertaining to the transaction to the second mobile device 201, up to and including all information pertaining to the transaction. In this alternative embodiment, the transaction can be passed from one mobile device 201 to the other without intervention from a mobile device 201.

The mobile device 201 can also be configured to communicate with a mobile device 201. In an exemplary embodiment, the mobile device 201 is configured to store multiple transactions. The server 203 can also communicate with multiple mobile devices 201, and can distribute transactions to a given mobile device 201 based on requests from said devices. In an exemplary embodiment, the mobile devices 201 are coupled to the server 203 using known network technologies, such as a wireless or wired network. Alternatively, the mobile devices 201 can communicate with the server 203 via public or private wireless networks using protocols such as CDMA, TDMA, GSM, 3G, LTE, 4G, or other communications technologies.

In an exemplary embodiment, the mobile device 201 exchanges transaction information with the server 203. By way of example, the mobile device 201 can request additional information about a transaction using the transaction identifier for that transaction. The server 203 can then, in response to receiving a request for a transaction with a given transaction identifier, transmit that transaction to the requesting mobile device 201.

The mobile device 201 can also transmit information about a transaction to the server 203. By way of example, a mobile device 201 can transmit the information pertaining to the items in a transaction to the server. In an alternative exemplary embodiment, the mobile device 201 can transmit an entire transaction to the server.

The mobile device 201 and the server can also exchange transaction commands. By way of example, a mobile device 201 can indicate to a server that a transaction is being passed from one mobile device 201 to another. In response to receiving this information, the server can then suspend the transaction until the pass is complete, thus ensuring that items cannot be unintentionally added to a transaction by a mobile device 201 that is not supposed to be adding items to a transaction.

The mobile device 201 can also be communicatively coupled to a check-out station. In an exemplary embodiment, the check-out station is a point of sale that includes systems used to complete a transaction. The exemplary check-out station can include systems such as credit card readers, near field communications devices, cash drawers, printers, scanners, and other equipment that one of ordinary skill in the art would understand can be used to receive tender to purchase items for a transaction.

In an exemplary embodiment, the mobile device 201 can send a transaction identifier to the check-out station in order to complete the transaction. The check-out station can then communicate with the server 203 and request the transaction information associated with that transaction. In an alternative exemplary embodiment, the mobile device 201 can transmit the complete transaction to the check-out station to complete the transaction.

The mobile device 201 can also be communicatively coupled with a customer mobile device 207. In an exemplary embodiment, the customer mobile device 207 is a mobile computing device such as a mobile telephone or tablet computer. The customer mobile device may be configured to communicate using a variety of protocols, including radiofrequency protocols such as Bluetooth, 802.11 (WiFi) protocols, or other point-to-point radiofrequency communication protocols. The customer mobile device 207 can also communicate via public wireless networks using protocols such as CDMA, GSM, 3G, LTE, 4G, or other protocols known in the art. In yet another alternative exemplary embodiment, the customer mobile device 207 can transmit information via non-radiofrequency methods, such as infrared (IR) communications. As one of skill in the art would understand, the customer mobile device 207 can communicate with the mobile devices 201 using any of the protocols available to the mobile device 201, as discussed in greater detail below.

In an exemplary embodiment, the customer mobile device 207 can communicate with the mobile device 201 without joining the same radiofrequency network as the mobile device. In that environment, the customer mobile device 207 can transmit the information to a central server via a public wireless network or direct connection with a network (such as a WiFi network) put in place to facilitate connection to the customer mobile device 207. The central server can then provide the information to the mobile device 201 through the server 203. In an alternative exemplary embodiment, the customer mobile device 207 can communicate directly with the mobile device using, by way of example, a point to point radiofrequency protocol (such as Bluetooth), another point-to-point protocol such as infrared communication, or a direct communication to the mobile device 201 (such as an SMS message). As one of skill in the art would understand, the communication protocol used to facilitate communication between the customer mobile device 207 and the mobile device 201 can be by one or more of the many methods of communication that would be well known to those of skill in the art.

In an exemplary embodiment, the customer mobile device 207 can communicate with the mobile device 201 to provide additional information about the customer. By way of example, the customer mobile device can provide a unique identifier for the customer, such as, by way of example only, a customer loyalty number, a telephone number, an address, a government issued identifier such as a social security number or tax ID number, a passport number, an electronic mail address or an identifier uniquely associated with a customer's mobile device such as a MAC address, or another identifier stored on the customer's device. The mobile device 201 can then obtain information already on file about that customer (such as contact information, preferred payment information, or saved "wish lists") by looking up the customer by the customer identifier. In an alternative exemplary embodiment, rather than providing the customer information by providing a customer identifier and having the mobile device 201 look up additional customer information, the customer mobile device 207 can provide the information (such as contact information, preferred payment information, or saved "wish lists") directly to the mobile device.

Figure 3:
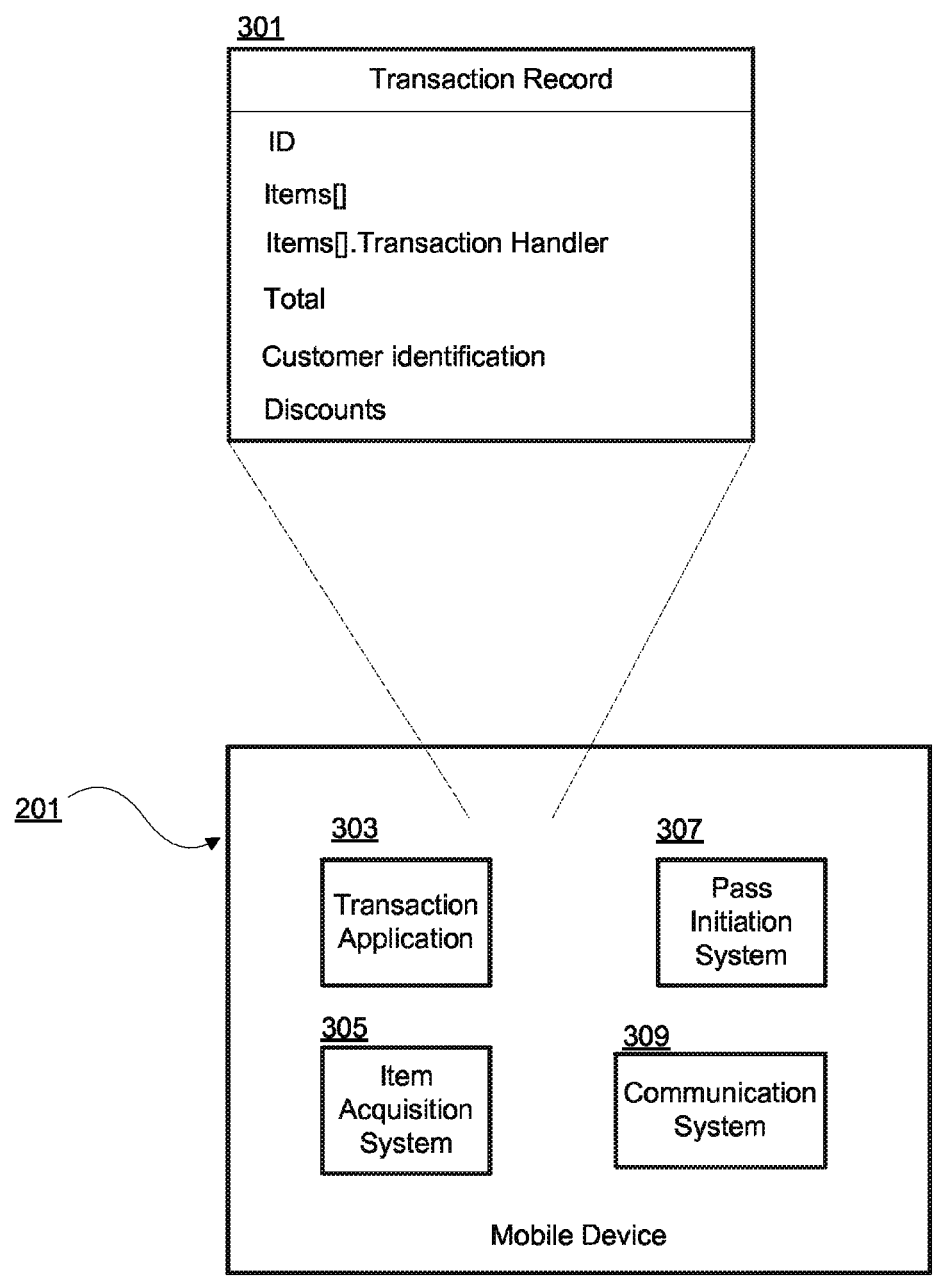
FIG. 3 is a block diagram illustrating an exemplary embodiment of a mobile device and a transaction record for use in the system for handling a single transaction with multiple devices in accordance with the methods and systems described herein.

Turning now to FIG. 3, the mobile device 201 is described in greater detail. In an exemplary embodiment, the mobile device 201 stores a transaction record 301. The transaction record 301 can include information pertaining to the transaction that the mobile device 201 is currently handling. The exemplary transaction record 301 has a transaction identifier (or ID) that identifies the transaction within the system.

The exemplary transaction also includes one or more items. The items can include data represent items that are to be purchased as part of the transaction. In an exemplary embodiment, items can be added to the list via the item acquisition system 305. The items can be stored in any data structure known to one of skill in the art as capable of storing information about multiple related items, such as, by way of example only, an array or a linked list.

The exemplary transaction can also include information about a transaction handler. This allows a single transaction to be handled by multiple parties, and to allow the transaction to keep a record of the party that is responsible for adding a particular item to a transaction. This feature can be advantageous in environments where multiple individuals can participate in adding items to a transaction, and where data pertaining to an individual's contribution to a transaction is important. Such environments can include, for example, commission based sales environments, or environments wherein a particular individual's performance is judged, in whole or in part, by that individual's contribution to sales. The information pertaining to the transaction handler can identify the individual by any means that is appropriate for the given environment. For example, the individual can be identified by name, employee identification number, or other identifier assigned to the individual. In an alternative exemplary embodiment, the identity of the device that was used to add the item to the transaction can be used to identify the transaction handler. In an exemplary embodiment, the data pertaining to the transaction handler is associated with the item. In an alternative exemplary embodiment, the transaction handler is stored separately and referenced by the item.

The transaction can also include additional information about the transaction. By way of example, the transaction can include an identification of the customer. The customer identification can, for example, be an identification number for a preferred customer or customer loyalty program. By identifying the customer, items can be added to the transaction from, for example, a "wish list" that the customer previously created. In an alternative exemplary embodiment, if the customer does not complete the transaction, the items can be added from the transaction and stored in a wish list or other repository for later purchase.

The exemplary transaction can also include other information pertaining to the transaction. For example, if the transaction will be subject to a discount, information pertaining to the discount can be stored along with the transaction. Information pertaining to the discount can include, by way of example, the amount of the discount, the items eligible for the discount, and the source of the discount (such as a coupon, in store promotion, or discount given to the customer for other reasons). The transaction can also include information such as the running total of the transaction.

In an exemplary embodiment, the mobile device 201 can also include a transaction application 303. The transaction application 303 comprises the software running on the mobile device 201 to allow the mobile device 201 to handle the transaction. In an exemplary embodiment, the transaction application 303 is a point of sale application that runs on a virtual machine on the server 203 such as, by way of example only, Microsoft Hypervisor running an instance of a point-of-sale system such as that provided by Oracle. With the mobile device 201 running the point of sale on a virtual machine, the point of sale can operate independent of the type of mobile device 201 used. In an alternative exemplary embodiment, the transaction application 303 can be a point of sale application running directly on the mobile device 201.

In an exemplary embodiment, the mobile device 201 also includes an item acquisition system 305. The item acquisition system 305 can be used to add items to the transaction. In the exemplary embodiment, the mobile device 201 uses a camera built in to the mobile device 201 to scan a bar code or other symbol associated with the item. In an alternative exemplary embodiment, the mobile device 201 can be coupled to an additional device, such as a sled or other peripheral device that allows a bar code or other symbol associated with the item to be scanned. The peripheral device can also be coupled to the mobile device by making a wireless connection to the virtual machine, either directly, or by connecting the peripheral device to an intermediary device such as a hub that makes a wireless connection to the virtual machine.

In yet another alternative exemplary embodiment, the item acquisition system 305 can allow for other methods of inputting the item number. For example, the item acquisition system 305 can allow the user of the device to manually enter the item number, or to select the item from a list or graphical user interface. The item acquisition system 305 can also use radiofrequency techniques, such as RFID, or image based technology to identify an item that should be added. As one of skill in the art would appreciate, the item acquisition system 305 can include any method of obtaining information identifying an item.

The mobile device 201 can also include a pass initiation system 307. The pass initiation system 307 takes input from the user device indicating that the user wishes to pass the transaction to another mobile device 201. In an exemplary embodiment, the pass initiation system 307 includes an accelerometer that detects a rapid acceleration or "bump" of the mobile device 201. The pass initiation system 307 can interpret this acceleration as an indication by the user of the mobile device 201 that the transaction is to be passed to another mobile device 201. In alternative exemplary embodiments, the pass initiation system 307 can take other inputs as an indication of an intent to pass. Such inputs can include, but are not limited to, a swipe on the screen of the mobile device 201, pressing a button or sequence of buttons on the mobile device 201, or providing verbal command to the mobile device 201 that is entered into the mobile device 201 using voice recognition software.

The exemplary pass initiation system 307 can also include a mechanism for determining whether the mobile device 201 that is intended to receive the transaction (the target mobile device 201) is able to do so. In an exemplary embodiment, the pass initiation system 307 determines whether the target mobile device 201 is proximate to the mobile device 201 that is sending the transaction. By way of example, the pass initiation system 307 can determine proximity using a variety of methods, such as, but not limited to, comparing GPS information between the two mobile devices 201, radiofrequency triangulation using, for example, Bluetooth or WiFi, or by determining (with, for example, a "ping") whether the devices are able to connect to one another. In an alternative exemplary embodiment, the target mobile device 201 could indicate its readiness to receive the transaction based on an acknowledgement from the user of that device. For example, the target mobile device 201 could present the user with a dialog box indicating that a transaction is incoming, and allow the user to accept or decline the transaction. In yet another alternative exemplary embodiment, the target mobile device 201 can be forced to receive the transaction without regard to proximity or acceptance from the user.

The mobile device 201 also includes a communication system 309. The communication system 309 provides basic network capabilities, as would be known to one of skill in the art. The communication system 309 also provides the mobile device 201 with the ability to send and receive transactions from another mobile device 201. In an exemplary embodiment, the communication system 309 is configured to communicate with other mobile devices 201 via audio signals. By way of example, a mobile device 201 will emit a series of audio signals through a speaker coupled to the mobile device 201. In the exemplary embodiment, the audio signals can be emitted in a frequency range that is inaudible to humans (for example, above 20,000 Hertz), but can be received by a microphone on the receiving mobile device 201. Alternatively the audio signals can be emitted in a frequency range that is audible to humans. The series of audio signals can be encoded in such a way as to represent data, and then decoded to receive that data, as one of ordinary skill in the art would understand.

In an alternative exemplary embodiment, the communication system 309 can communicate via radio frequency communication, such as, by way of example, Bluetooth, 802.11 (WiFi) protocols, or other point-to-point radiofrequency communication protocols. The communication system 309 can also communicate via public wireless networks using protocols such as CDMA, GSM, 3G, LTE, 4G, or other protocols known in the art. In yet another alternative exemplary embodiment, the communication system 309 can transmit information via non-radiofrequency methods, such as infrared (IR) communications. As one of skill in the art would understand, the communication system 309 can use any method of wired or wireless communication to transmit and receive a transaction.

Figure 4:
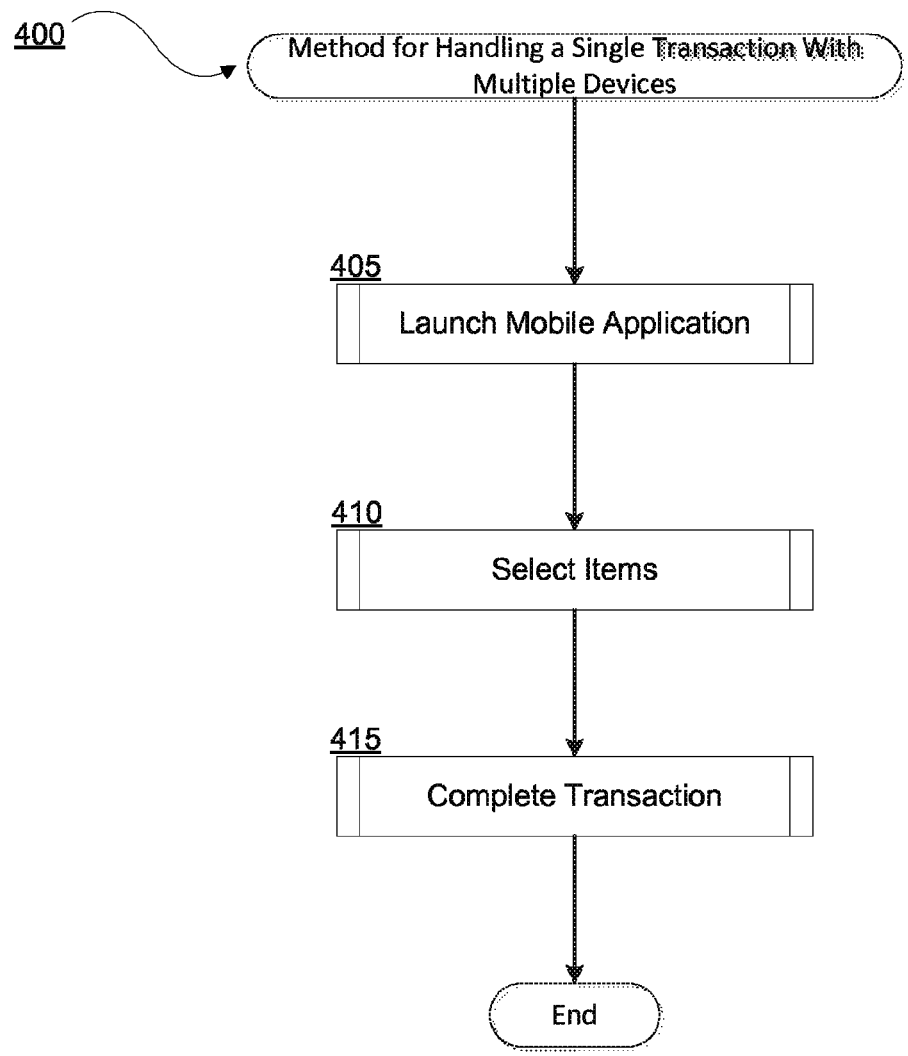
FIG. 4 is a flow chart illustrating an exemplary method for handling a single transaction with multiple devices in accordance with the methods and systems described herein.

Turning now to FIG. 4, an exemplary method for handling a single transaction with multiple devices is described. The method starts with step 405, in which the mobile application running on the mobile device 201 is launched. Step 405 will be discussed in greater detail with respect to FIG. 5. The method then proceeds to step 410, wherein items are selected for the transaction. The method for selecting items for the transaction will be discussed in greater detail with respect to FIG. 6. The method then proceeds to step 415, wherein the transaction is completed. The method for completing the transaction will be discussed in greater detail with respect to FIG. 8. The method then ends.

Figure 5:
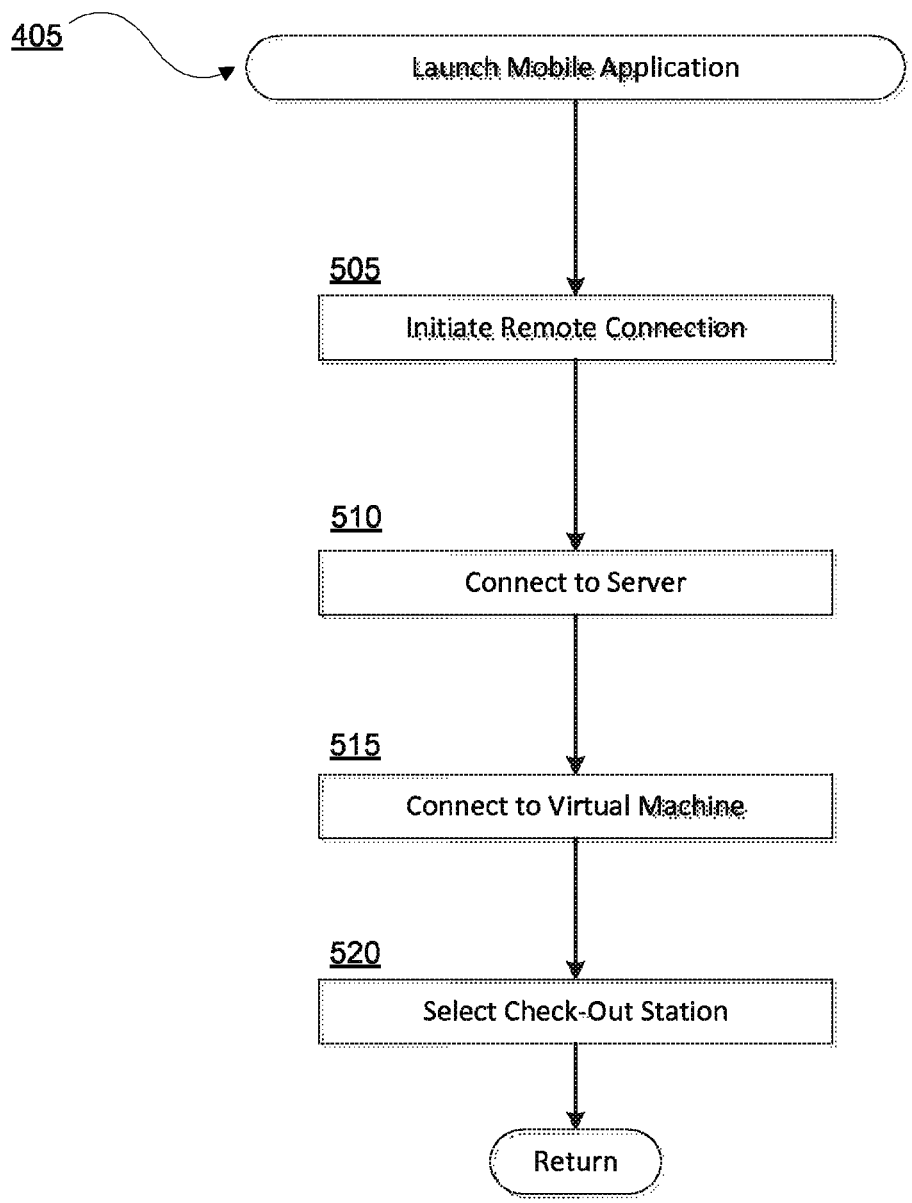
FIG. 5 is a flow chart illustrating an exemplary method for launching a mobile application in accordance with the methods and systems described herein.

Turning now to FIG. 5, an exemplary method 405 for launching the mobile application is described. The method begins with step 505, in which a remote connection is initiated. In an exemplary embodiment, the method proceeds to step 510, in which the mobile device 201 connects with a server 203 to prepare the mobile device 201 for handling transactions. In an exemplary embodiment, the mobile device 201 operates a virtual machine that is run on the server 203. In an alternative exemplary embodiment, the mobile device 201 runs a transaction application 303 locally, and connects to the server 203 only to the extent necessary to receive transaction information.

The method then proceeds to step 515, in which the mobile device 201 connects to the virtual machine. This step takes place only when operating in a virtual machine environment, and is not executed when the transaction application 303 is operated locally on the mobile device 201. With respect to step 515, the mobile device 201 makes a connection to the virtual machine running on the server 203 and initiates execution of the virtual machine.

The method proceeds to step 520, in which a check out station 205 is selected. In the exemplary embodiment, the mobile device 201 associates itself with the closest check out station 205. In an alternative exemplary embodiment, the mobile device 201 associates itself with a check out station 205 that has the necessary equipment (such as, but not limited to, a credit card reader, a cash drawer, or other appropriate devices for completing a given transaction. In another alternative exemplary embodiment, the mobile device 201 associates itself with a check out station 205 that has been selected by the user of the mobile device 201. In yet another exemplary embodiment, the mobile device 201 does not select a check out station 205 at this point, but rather, the mobile device 201 that is selected to complete the transaction selects a check out station 205 at that time. The method then returns and proceeds to step 410 of FIG. 4.

Figure 6:
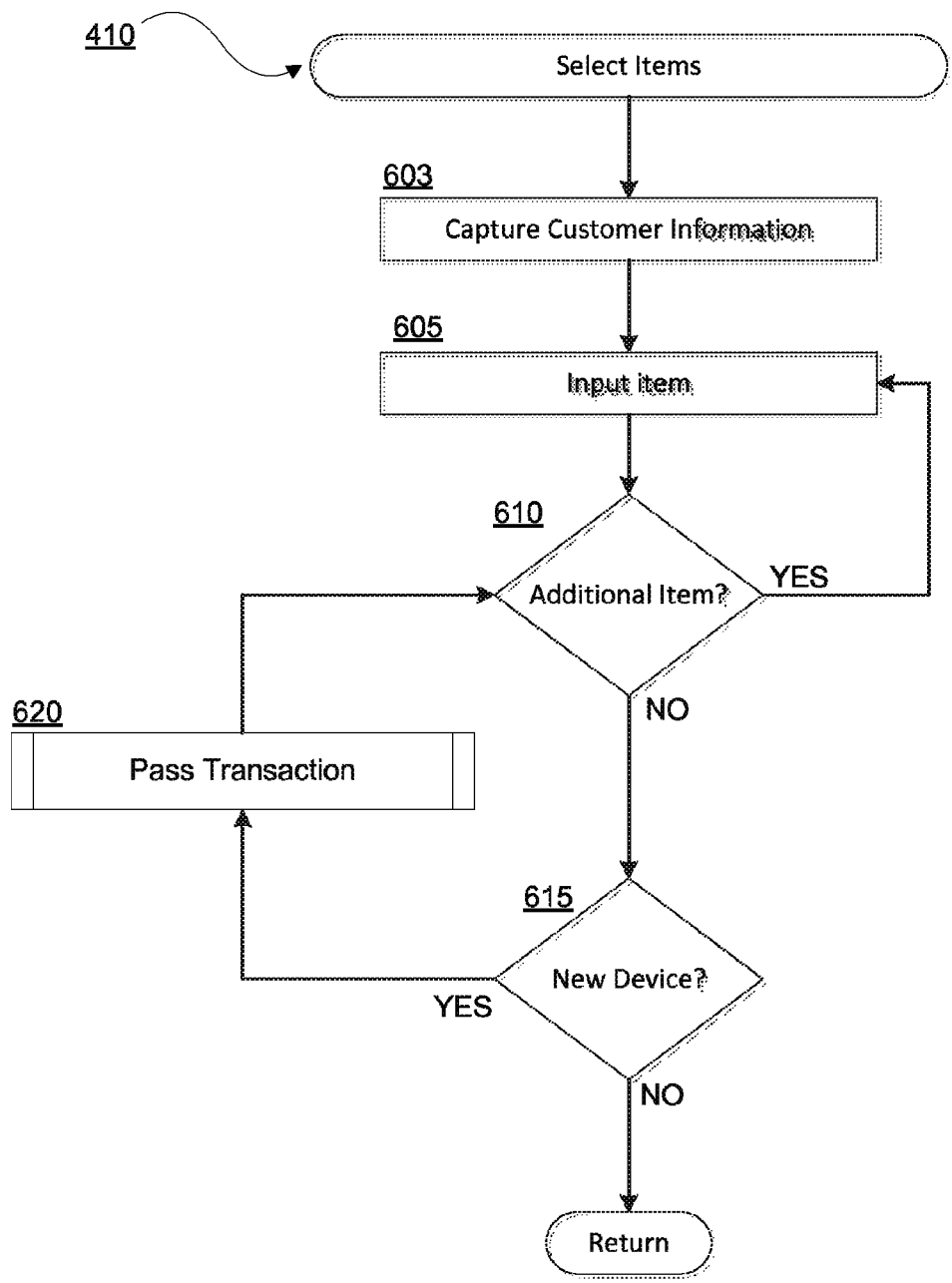
FIG. 6 is a flow chart illustrating an exemplary method for selecting items in accordance with the methods and systems described herein.

Turning now to FIG. 6, an exemplary method 410 for selecting items is described. The method begins with step 603, in which customer information is captured. In an exemplary embodiment, the customer information is transmitted to the mobile device 201 from a customer mobile device 207. The mobile device 201 may then retrieve additional information about the customer if, for example, the customer information includes a customer identifier that allows further lookup of the customer information in, for example, a customer loyalty database. In an alternative exemplary embodiment, the customer information can be received from the customer and input directly into the mobile device 201.

The method then proceeds to step 605, in which an item is inputted. In an exemplary embodiment, the user uses the item acquisition system 305 to add an item to the transaction according to the procedures operative in the given environment.

The method then proceeds to decision step 610, in which it is determined whether the current mobile device 201 is to add additional items to the transaction. If the determination in decision step 610 is affirmative, the method proceeds to step 605, in which additional items are added to the transaction.

If, on the other hand, the determination in decision step 610 is negative, the method 410 proceeds to step 615, in which it is determined whether the transaction should continue on another device. If the determination in stem 615 is negative, the method returns and proceeds to step 415 of FIG. 4.

If, on the other hand, the determination in step 615 is affirmative, the method proceeds to step 620, in which the transaction is passed to another mobile device 201. The method of step 620 will be described in greater detail with respect to FIG. 7. The method 410 then proceeds to step 610, and the method then proceeds as described above.

Figure 7:
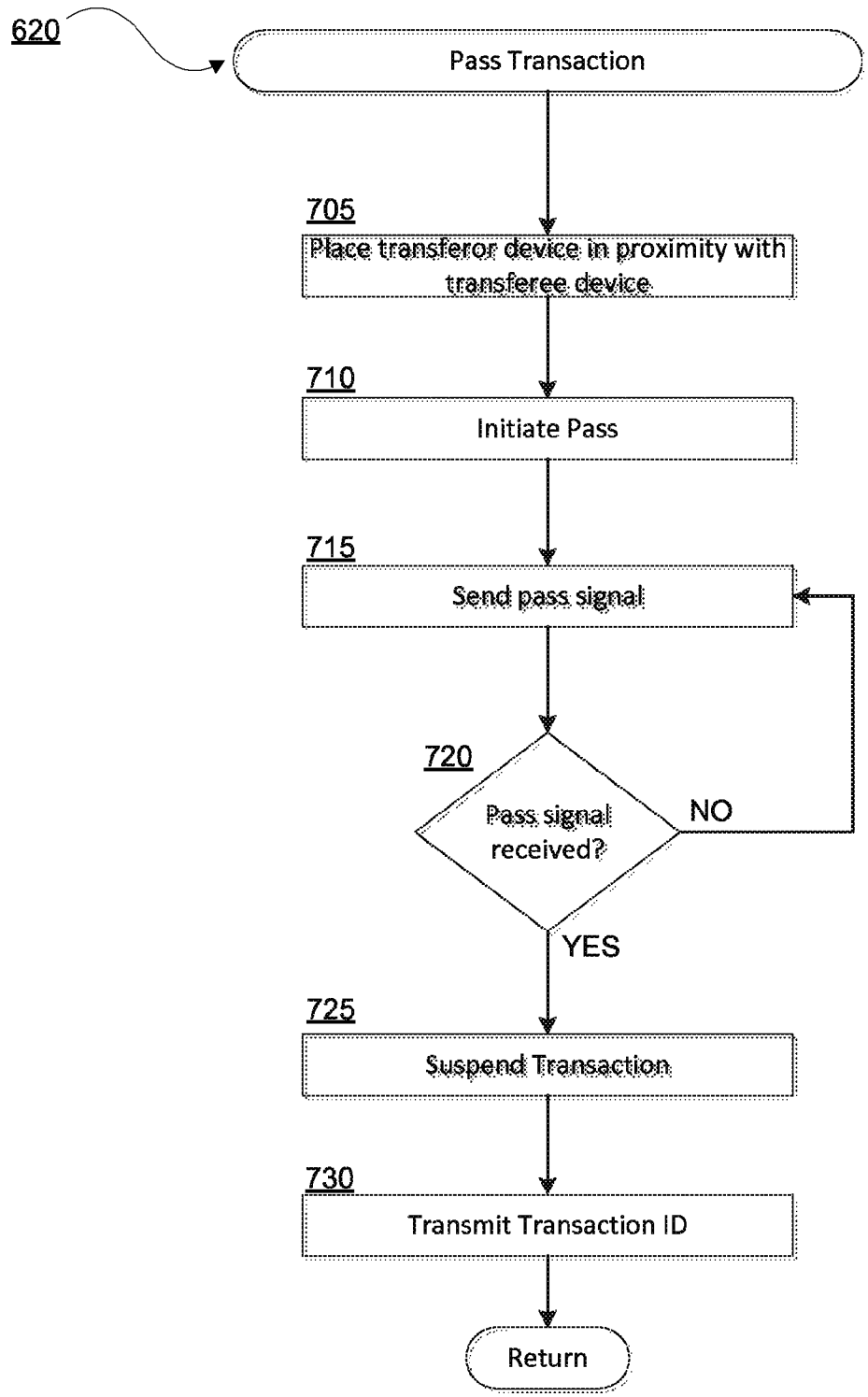
FIG. 7 is a flow chart illustrating an exemplary method for passing a transaction in accordance with the methods and systems described herein.

Turning now to FIG. 7, an exemplary method 620 for passing a transaction to a mobile device 201 is described. The method 620 begins at step 705, in which the mobile device 201 is placed in proximity with the target mobile device 201. The proximity of the devices must be understood in context with the environment in which they are operating. By way of example, in a retail environment, proximity may be a few feet from one another. Alternatively, in a remote sales environment, proximity may reflect devices that are able to communicate with one another.

The method 620 then proceeds to step 710, in which the pass is initiated. In an exemplary embodiment, the pass is initiated when the user of the mobile device 201 signals the intent to pass the transaction to another mobile device 201 using the pass initiation system 307. In alternative exemplary embodiments, the pass can be initiated by another party, such as the server 203, which can initiate the pass from one mobile device 201 to another.

The method then proceeds to step 715, in which the pass signal is sent. In an exemplary embodiment, the pass signal is sent using the communication system 309. The method then proceeds to decision step 720, in which it is determined whether the pass signal was received. If the determination in step 720 is negative, the method proceeds to step 715, in which the pass signal is resent. If, on the other hand, the determination in step 720 is affirmative, the method proceeds to step 725.

In step 725, the method 620 suspends the transaction. By suspending the transaction, the method 620 ensures that the original mobile device 201 (or any unintended mobile devices 201) can add items to the transaction until the pass is complete. The method 620 then proceeds to step 730, wherein information identifying the transaction is passed to the target mobile device 201. Once the transaction has passed to the target mobile device 201, the transaction is allowed to resume. The method then returns to step 610 of FIG. 6.

Figure 8:
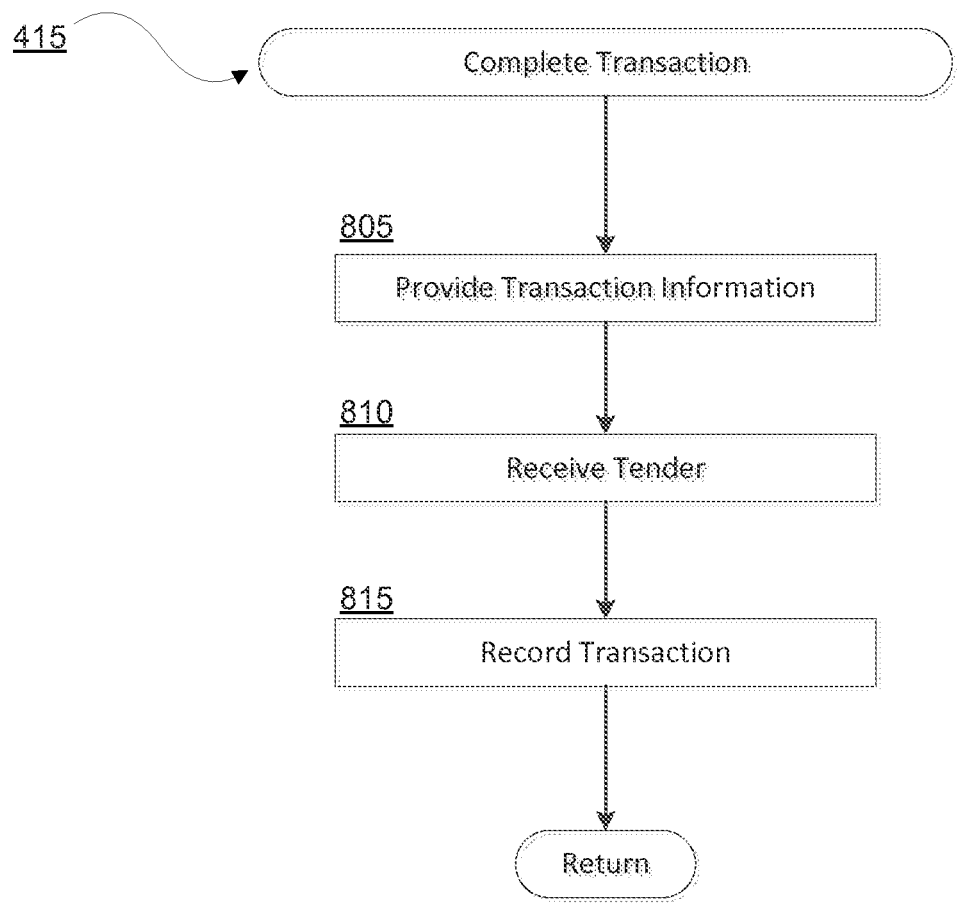
FIG. 8 is a flow chart illustrating an exemplary method for completing a transaction in accordance with the methods and systems described herein.

Turning now to FIG. 8, an exemplary method 415 for completing the transaction is described. The method begins with step 805, in which transaction information is provided to the check out station 205. The method then proceeds to step 801, in which tender is received for the transaction. Finally, the method proceeds to step 815, in which the transaction is recorded. The method then returns, and ends.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A system for handling a transaction with multiple devices, comprising:
   a transaction comprising a plurality of items that are to be purchased as part of the transaction and a transaction identifier, the transaction stores information pertaining to at least one item;
   a first point of sale device comprising:
      a transaction application that receives information pertaining to the transaction;
      an item acquisition system that obtains information about an item and add that item to the transaction;
      a communication system that transmits information pertaining to the transaction to a second point of sale device; and
      a pass initiation system that receives an indication that the transaction is to be passed to a second point of sale device;
   a second point of sale device comprising:
      a communication system that receives information pertaining to the transaction from the first point of sale device; and
      an item acquisition system that obtains information about an item; and
   a customer mobile device, comprising:
      a communication system that transmits a unique identifier relating to the customer to one of the first point of sale device and the second point of sale device via radiofrequency transmission, wherein the customer mobile device communicates with the first or second point of sale device without joining the same radiofrequency network as the first and second point of sale devices;
      the unique identifier selected from the group consisting of a customer loyalty number, a telephone number, an address, a government issued identifier, a passport number, an electronic mail address, and an identifier uniquely associated with the customer mobile device,
      wherein the point of sale device uses the unique identifier to obtain information about the customer,
   wherein on receiving an indication that the transaction is to be passed to the second point of sale device, information pertaining to the transaction is transmitted to the second point of sale device.

2. The system of claim 1, wherein the transaction stores information identifying the point of sale device that was used to add the item to the transaction.

3. The system of claim 1, wherein the transaction stores information pertaining to a user that added the item to the transaction.

4. The system of claim 1, wherein the item acquisition system comprises a scanner.

5. The system of claim 1, wherein the point of sale device uses the unique identifier to obtain information about the customer from a server.

6. The system of claim 1, wherein the communication system communicates via audio signals.

7. The system of claim 1, wherein the information pertaining to the transaction transmitted to the second point of sale device is the transaction identifier.

8. The system of claim 7, wherein the second point of sale device obtains the information pertaining to at least one item from a server.

9. The system of claim 8, wherein the server suspends the transaction on receiving an indication that the transaction is to be passed to a second point of sale device.

10. The system of claim 9, wherein the server resumes the transaction on receiving an indication that the transaction has been passed to the second point of sale device.

11. The system of claim 1, wherein the first point of sale device and the second point of sale device comprise mobile devices.

12. The system of claim 1, wherein the first point of sale device and the second point of sale device comprise at least one of: a mobile telephone, a tablet computer, a point of sale terminal, and a laptop computer.

13. A method for handling a transaction with multiple point of sale devices, comprising:
   storing, on a first point of sale device, information pertaining to a transaction, the transaction comprising a plurality of items that are to be purchased as part of the transaction, the information comprising an identification of an item in the transaction;

receiving, on the first point of sale device, an indication that the transaction will be passed to a second point of sale device;

in response to receiving an indication that the transaction will be passed to the second point of sale device, transmitting an indication to a server that the transaction should be suspended and transmitting identifying information pertaining to the transaction to the second point of sale device;

in response to transmitting an indication to a server that the transaction should be suspended, suspending the transaction;

receiving, on the second point of sale device, identifying information pertaining to the transaction;

transmitting, from the second point of sale device, identifying information pertaining to the transaction to the server;

in response to transmitting identifying information pertaining to the transaction to the server, receiving, on the second point of sale device, the transaction;

in response to receiving the transaction on the second point of sale device, resuming the transaction;

receiving on one of the first point of sale device and the second point of sale device, a unique identifier relating to a customer via radiofrequency transmission from a customer mobile device, wherein the customer mobile device communicates with the first or second point of sale devices without joining the same radiofrequency network as the first and second point of sale devices, the unique identifier selected from the group consisting of a customer loyalty number, a telephone number, an address, a government issued identifier, a passport number, an electronic mail address, and an identifier uniquely associated with the customer mobile device;

using the unique identifier to obtain information about the customer;

adding an item to the transaction using the second point of sale device; and transmitting the transaction to a point of sale device configured to receive tender to complete the transaction.

\* \* \* \* \*